This invention relates in general to packing or fluid seals for rods, shafts, bearings or the like which comprise a resilient packing ring interposed between a shaft and a housing; and more particularly the invention contemplates a packing or a fluid seal for use in hydraulic units such as that manufactured by Bendix Products Division of Bendix Aviation Corporation under the trademark "Hydrovac."

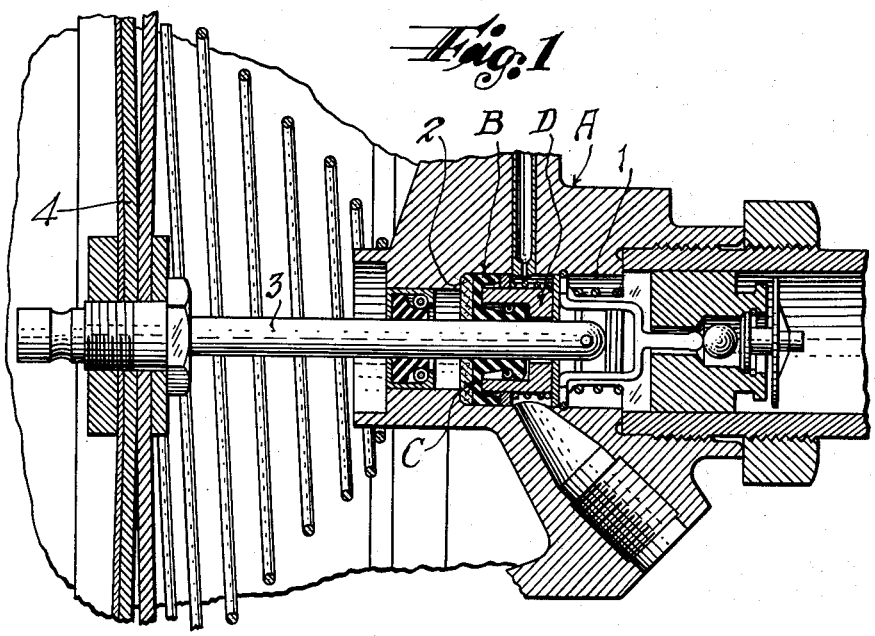
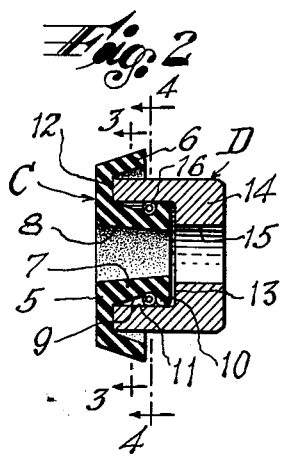 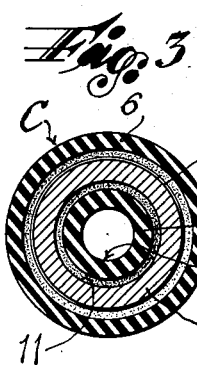 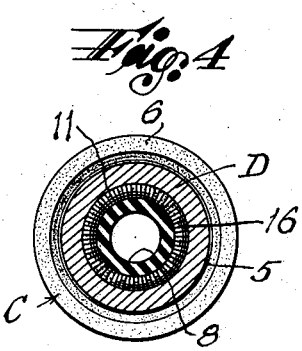
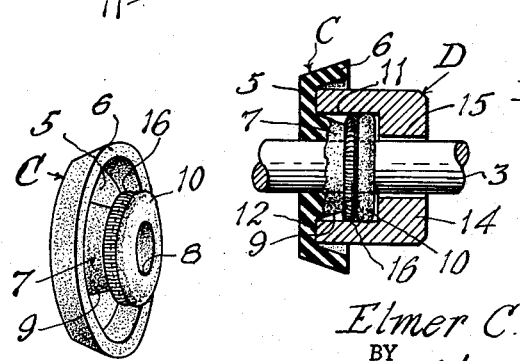
INVENTOR.
Elmer C. Pagano,
BY
ATTORNEY 3,110,502
PACKING FOR HYDRAULIC POWER UNITS
Elmer C. Pagano, West Orange, N.J., assignor to Surelock Manufacturing Co. Inc., Newark, N.J., a corporation of New York
Filed Nov. 29, 1957, Ser. No. 699,639
2 Claims. (Cl. 277—189)

The invention is especially directed toward improvements in such a fluid seal or packing of the type which includes a resilient sealing element having a circular body portion which has a normally frusto-conical coaxial flange flaring outwardly from the periphery of the body portion to engage the walls of a housing, and a tubular extension projecting coaxially from the body portion at the same side thereof as said flange to snugly resiliently fit a rod or shaft, in combination with a metallic cup-like retainer which encircles said extension with its edge portion in abutting relation to said body portion of the sealing element to coact with a spring for clamping the sealing element against a seat in the housing. Such fluid seals leave much to be desired in that the sealing element quickly becomes worn by frictional contact with the rod or shaft so that leakage occurs between the sealing element and the shaft.

A primary object of the invention is to provide a packing or fluid seal of this character which shall embody a novel and improved construction and combination of the sealing element and the retainer which shall overcome the objections to the known types of fluid seals and shall ensure a fluid-tight engagement of the sealing element with the rod or shaft and the walls of the housing and shall automatically compensate for wear of the sealing element by the rod or shaft.

Another object is to provide a combination of a sealing element and a retainer of the type particularly described wherein the tubular extension of the sealing element shall embody novel and improved construction whereby coaction between the sealing element and the retainer shall constantly urge or press the tubular extension into fluid tight contact with the rod or shaft.

Other objects of the invention are to provide a sealing element of this character which shall have an external outwardly projecting circumferential bead adjacent the free end of the tubular extension to coact with the walls of the cup-shaped retainer for pressing the inner surfaces of the tubular extension into fluid tight contact with the rod or shaft, and to obtain other objects and advantages to be brought out by the following description in conjunction with the accompanying drawings in which—

FIGURE 1 is a fragmentary schematic sectional view of a hydraulic power unit including a packing or fluid seal embodying the invention;

FIGURE 2 is an enlarged central vertical longitudinal sectional view through the assembled sealing unit and retainer;

FIGURE 3 is a transverse vertical sectional view on the plane of the line 3—3 of FIGURE 2;

FIGURE 4 is a similar view on the plane of the line 4—4 of FIGURE 2;

FIGURE 5 is a view similar to FIGURE 2 but showing portions of the sealing element in side elevation; and FIGURE 6 is a detached perspective view of the sealing element.

For the purpose of illustrating the principles of the invention, the sealing element has been shown in connection with a known type of hydraulic power unit, particularly a unit known as the "Hydrovac" and manufactured by Bendix Products Division of Bendix Aviation Corp., although the invention is susceptible to use in other types of fluid pressure apparatus.

As shown, the apparatus includes a main housing A in which is a cylindrical chamber 1 that has a seat 2 at one end thereof against which the packing B embodying the invention is normally spring-pressed. Mounted in the housing and extending coaxially of the chamber 1 is a rod or shaft 3 that is connected to a diaphragm 4.

The particular construction and operation of the apparatus is immaterial to the present invention which resides in the packing or fluid seal B that includes a resilient or elastic sealing element generally designated C and a rigid or metallic retainer generally designated D.

The sealing element may be formed of a suitable material such as rubber or a rubber compound and includes a washer-like circular body portion 5 from the periphery of which extends a coaxial integral flange 6 which normally flares outwardly and projects from one side of the body portion 5. An integral coaxial tubular extension flange 7 projects centrally from the same side of the body portion 5 as the flange 6 and has a frusto-conical central opening 8 therethrough of a normal diameter, before installation of the element, which is slightly less than the diameter of the rod 3 so that when the rod is forced through said opening as shown in FIGURES 1 and 5, the walls of the extension are expanded and the inner surface of the opening 8 is held with a fluid-tight resilient wiping contact with the rod 3. The exterior surface of the extension 7 is preferably frusto-conical as indicated at 9 with its larger end merging into the body portion 5 in spaced relation to the base of the flange 6; and the free end of the tubular extension has an outwardly extending circumferential projection or bead 10 the diameter of which is normally approximately equal to the diameter of a cylindrical recess 11 in the cup-shaped retainer D.

As shown, the retainer D is adapted to fit over and enclose the tubular extension 7 with its rim or edge 12 in abutting contact with the base portion 5 and with the inner end or bottom wall 13 of the recess 11 in spaced relation to the free end of the extension 7 (FIGURES 2 and 5). The base portion 14 of the retainer has a coaxial opening 15 of a diameter greater than the diameter of the rod 3 as shown in FIGURES 1 and 5. With this construction, when the sealing element C and retainer D are assembled as shown in FIGURE 2, and the rod 3 is slipped through the openings 8 and 15, the outer periphery of the bead 10 of the sealing element is pressed into contact with the cylindrical wall of the recess 11 and the inner surface of the opening 8 is pressed into fluid tight contact with the rod 3; and when the assembly is mounted in the chamber 1 of the housing, the retainer D is pressed to hold the rim 12 of the retainer in contact with the body portion of the sealing element as best shown in FIGURE 1.

It is also desirable, although not necessary, to provide a circular helical spring 16 in the groove formed by the juncture of the frusto-conical wall 9 and the bead 10 of the extension 7 to normally bias the wall of the extension uniformly inwardly into contact with the rod 3; and to prevent undue expansion of the spring, the spring may normally engage the cylindrical wall of the recess 11 as best shown in FIGURES 2 and 5.

With this construction, it will be observed that the tubular extension 7 will be firmly but yieldingly held in fluid tight contact with the rod 3, and substantial wear of the inner surfaces of the extension will be compensated by the coaction of the rib 10 with the cylindrical wall of the recess 11 of the retainer D, even under sudden surges of fluid pressure. Also, the spring 16 will constantly tend to press the walls of the extension into contact with said rod.

It will be understood by those skilled in the art that during use there is a tendency for sealing elements of this general type to swell or expand, and such swelling or expansion will cause compression of the beaded portion of the wall of the tubular extension between the rod and the cylindrical wall of the recess 11 and thereby cause the inner surface of the opening 8 of the extension to be pressed into fluid tight yielding contact with the rod.

While the now preferred embodiment of the invention has been illustrated and described, it should be understood that changes in the shape of the sealing element and retainer may be made to accommodate different devices or apparatus to be packed or sealed, all within the spirit and scope of the invention.

What I claim is:

1. For use in a device including a cup-shaped retainer for sealing the annular space between the cylindrical wall of a chamber and a cylindrical rod extending through the chamber, a molded resilient sealing element including a washer-like body portion having an integral outwardly flaring peripheral flange projecting from one side thereof, and a coaxial frusto-conical extension integrally connected at its larger end to said body portion and projecting from said side thereof with said larger end spaced from said peripheral flange, there being a frusto-conical opening through said extension and said body portion with its larger end at the larger end of said extension and its smaller end of a diameter less than said cylindrical rod, said extension having an integral circumferential outwardly projecting bead at the smaller free end thereof whose external diameter is approximately equal to the internal diameter of the recess in said retainer.

2. A sealing device comprising a washer-like body portion of rubber-like resilient material having an integral outwardly flaring peripheral flange projecting from one side thereof, and a coaxial frusto-conical extension integrally connected at its larger end to said body portion and projecting from said side thereof, there being a frusto-conical opening through said extension and said body portion with its larger end at the larger end of said extension, said extension having an integral circumferential outwardly projecting bead at the smaller free end thereof, and a retainer having a cup-like recess opening through one end thereof of a depth greater than the length of said extension and formed with a bottom wall and a cylindrical wall of a diameter approximately equal to the largest external diameter of said bead on said extension fitted over said extension with the outer periphery of said bead in contact with said cylindrical wall and with the end surface of said retainer opposite said bottom wall in contact with said body portion between said flange and said extension, the smaller end of said conical opening being of a diameter less than said rod, said bottom wall having an opening coaxial with and of greater diameter than the opening through said extension, providing for pressure of said bead into contact with said cylindrical wall and for pressure of the inner surface of said conical opening into contact with a rod whose diameter is greater than that of the smaller end of the conical opening, when said rod is forced through said conical opening and the opening in said bottom wall of the retainer.

References Cited in the file of this patent

UNITED STATES PATENTS

| | | |
|---|---|---|
| 2,162,104 | Mosher | June 3, 1939 |
| 2,249,141 | Johnson | July 15, 1941 |
| 2,647,002 | Brummer | July 28, 1953 |
| 2,726,884 | Price | Dec. 13, 1955 |
| 2,815,995 | Young | Dec. 10, 1957 |
| 2,818,287 | Josephson | Dec. 31, 1957 |